(12) United States Patent
Hellesøy et al.

(10) Patent No.: US 12,317,873 B2
(45) Date of Patent: Jun. 3, 2025

(54) FISH FARMING TANK WITH AN INTERNAL BUOYANCY BALLAST TANK

(71) Applicant: OVUM AS, Bergen (NO)

(72) Inventors: Åsmund Hellesøy, Blomsterdalen (NO); Cato Lyngøy, Hjelmås (NO); Halvor Larsson Aga, Bergen (NO)

(73) Assignee: OVUM AS, Bergen (NO)

( * ) Notice: Subject to any disclaimer, the term of this patent is extended or adjusted under 35 U.S.C. 154(b) by 103 days.

(21) Appl. No.: 17/795,682

(22) PCT Filed: Jan. 27, 2021

(86) PCT No.: PCT/NO2021/050022
§ 371 (c)(1),
(2) Date: Jul. 27, 2022

(87) PCT Pub. No.: WO2021/154087
PCT Pub. Date: Aug. 5, 2021

(65) Prior Publication Data
US 2023/0106735 A1    Apr. 6, 2023

(30) Foreign Application Priority Data
Jan. 28, 2020   (NO) .................................. 20200111

(51) Int. Cl.
*A01K 61/60*   (2017.01)
*A01K 63/00*   (2017.01)

(52) U.S. Cl.
CPC .............. *A01K 61/60* (2017.01); *A01K 63/00* (2013.01)

(58) Field of Classification Search
CPC ........ A01K 61/60; A01K 63/00; A01K 61/00; B63G 8/22; B63G 8/24; B63B 13/00; B63B 43/06
See application file for complete search history.

(56) References Cited

U.S. PATENT DOCUMENTS 790,046 A * 5/1905 Gildea ................... E02D 23/02
                                                              405/8
4,224,891 A   9/1980 Rinaldi
(Continued)

FOREIGN PATENT DOCUMENTS

CA    1075092 A  * 4/1980 ............ B63B 1/107
GB    2 031 251 A    4/1980
(Continued)

OTHER PUBLICATIONS

Norwegian Search Report for Norwegian Application No. 20200111 dated Aug. 5, 2020.
(Continued)

*Primary Examiner* — Morgan T Jordan
*Assistant Examiner* — Carly W. Lynch
(74) *Attorney, Agent, or Firm* — Alix, Yale & Ristas, LLP (57) ABSTRACT

A farming tank includes a closed, rigid shell generally containing a farming body for aquaculture animals such as fish or shellfish, the shell being essentially ellipsoidal or egg-shaped and arranged to have a generally vertical main axis, and at least one internal ballast tank is arranged within the shell and at an upper section of the shell. The ballast tank has a radially outer wall which follows along a higher-lying section of the shell or is formed by a high-lying section of the shell itself, and a ballast pump arranged to fill or empty the ballast tank partially or completely with water via a ballast water pipe.

20 Claims, 5 Drawing Sheets

(56) References Cited

U.S. PATENT DOCUMENTS

| | | | |
|---|---|---|---|
| 11,261,105 B1* | 3/2022 | Fesi | C02F 1/40 |
| 2004/0023571 A1* | 2/2004 | Warriner | B63B 1/047 |
| | | | 441/40 |
| 2005/0284353 A1* | 12/2005 | Warnes | B63B 39/03 |
| | | | 114/125 |
| 2006/0265940 A1 | 11/2006 | McAleer, Jr. et al. | |
| 2010/0224136 A1* | 9/2010 | Papadoyianis | A01K 61/60 |
| | | | 119/223 |
| 2011/0174232 A1 | 7/2011 | Hoie | |
| 2016/0129979 A1* | 5/2016 | Rossano | B63G 8/00 |
| 2019/0274289 A1 | 9/2019 | Leow | |

FOREIGN PATENT DOCUMENTS

| | | | |
|---|---|---|---|
| NO | 343945 B1 | 7/2019 | |
| WO | WO 2015/099540 A1 | 7/2015 | |
| WO | WO 2017/026899 A1 | 2/2017 | |
| WO | WO 2019/035719 A1 | 2/2019 | |

OTHER PUBLICATIONS

International Preliminary Report on Patentability, issued in PCT/NO2021/050022, dated Nov. 18, 2021.
International Search Report, issued in PCT/NO2021/050022, dated Jun. 15, 2021.
Written Opinion of the International Searching Authority, issued in PCT/NO2021/050022, dated Jun. 15, 2021.

* cited by examiner

FISH FARMING TANK WITH AN INTERNAL BUOYANCY BALLAST TANK

The invention is a farming tank with a vertical, main axis and is equipped with a closed, rigid shell and arranged to contain a farming volume for fish. More specifically, the tank has an inner, highly placed ballast tank arranged inside the shell.

PROBLEMS RELATED TO FARMING TANKS

If one has a farming tank with a floating collar, the floating collar will provide an attack point for incoming waves. This can, in demanding sea conditions, lead to a stronger hydrodynamic response than desired, and one can experience waves slamming against the annular, generally vertical outer side of the floating collar. In such demanding sea conditions, one can also experience that the free inner surface also contributes negatively to the hydrodynamic response and that inner surface waves occur which strike and are in danger of damaging the farming organisms or internal equipment for handling fish, separating grids and/or nets. In general, it is also desirable to limit the swaying that otherwise interferes with flow in pipes and tanks in treatment plants.

BACKGROUND TECHNOLOGY FOR THE FIELD

D1 WO2019035719 belonging to Hauge Aqua, describes a vertically standing, egg-shaped farming tank with a floating collar and with a ballast section arranged in the bottom part.

D2 NO343945 SmartFlex AS, describes a floating, closed fish farm installation comprising a toroidal tank and a centre raft. An annular walkway is arranged over the water surface inside the annular tank.

D3 U.S. Pat. No. 4,224,891 Rinaldi describes at the top straight-cut, partially egg-shaped frame structures that carry a common platform or deck structure. The frame structure comprises an outer and an inner frame profile where annular storage and ballast tanks are arranged in the lower third. There is an axially, central, large opening at the bottom.

D4 U.S. Pat. No. 4,224,891 Leow describes a system and a method for offshore aquaculture and aquaculture which is close to land by using floating, closed, flattened farming tanks with an approximately circular plan outline.

BRIEF SUMMARY OF THE INVENTION

The invention contributes to solving such problems and related problems and can be summarised as a farming tank (1),
- with a closed, rigid shell (10) generally containing a farming volume (2) for fish,
- where the shell (10) is, essentially, ellipsoidal or egg-shaped and arranged to have a generally vertical main axis (a), and
- at least one inner ballast tank (20) arranged inside the shell (10) and at an upper part (11) of the shell (10).

Subordinate but inventive features of the farming tank are set out in the dependent claims enclosed.

BRIEF DESCRIPTION OF THE FIGURES

The invention is illustrated in the enclosed figures, in which:

FIG. 4 illustrates variants of configurations of the ballast tank (20) in the higher section of the shell (10) of the tank (1).

FIG. 5 illustrates a sump (90) for collecting dead fish and drainage at the bottom of the farming volume as well as a drainage pipe (91) indirectly to a particle separator (93) and a sludge tank (96) at the working deck in the upper section (11) of the tank (1).

DESCRIPTION OF EMBODIMENTS OF THE INVENTION

The invention is a farming tank (1), where the tank has:
a closed, rigid shell (10), except for necessary pipe passages, valves, etc., generally containing a farming volume (2) for aquaculture animals such as fish or shellfish,
where the shell (10) is arranged to have a generally vertical main axis (a)/long axis, and is preferably shaped like an egg or approximately a vertical long axis rotational ellipsoid, and further preferably having an egg-shape with the blunt end down and the pointed end up, and where the characteristic of the invention is
at least one highly placed internal ballast tank (20) with its volume arranged inside the shell (10) and at an upper section (11) of the shell (10).

One part of the upper section (11) of the shell can constitute the outer wall (24) of the ballast tank (20) which is thereby integrated, while one wall (22) delimits the ballast tank (20) inwards towards the upper part of the farming volume (2).

The farming tank (1) is designed to be moored and is fitted with fastening points for mooring lines.

Figure 4A:
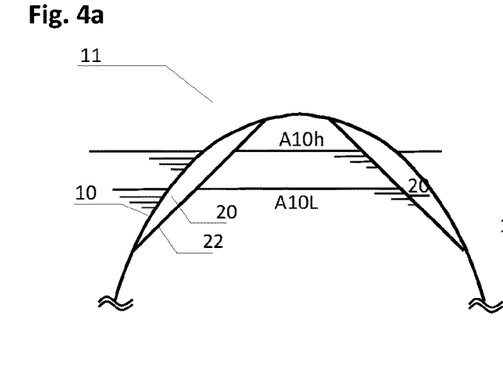
FIG. 4a illustrates a vertical section of a purely conical, funnel-shaped, inner wall (22) of a ballast tank (20) according to the invention in a vertical ellipsoid or egg-shaped shell (10).
Figure 4B:
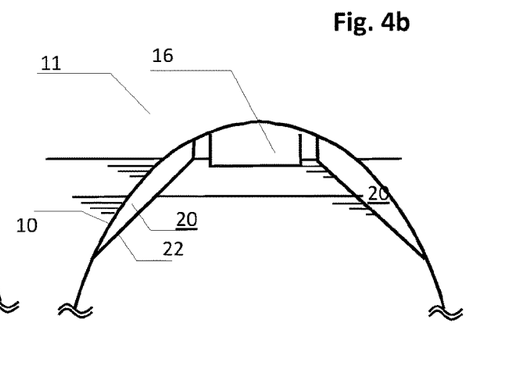
FIG. 4b illustrates, in the same projection as FIG. 4a, a partially conical, funnel-shaped, inner wall (22) of a ballast tank (20) according to the invention in a vertical ellipsoidal or egg-shaped shell (10), where the upper part of the inner wall (22) of the ballast tank runs into a vertical casing, and where a centrally arranged, generally cylindrical, upper inner section (which can have a working floor 16 or only be a tank) is arranged in the middle of this upper cylindrical section of the inner wall of the ballast tank. This embodiment indicates the main shape of that shown in FIG. 3.
Figure 4C:
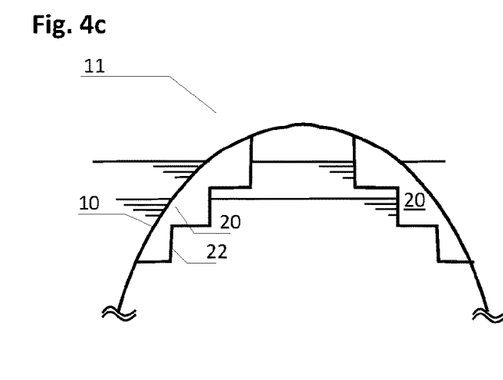
FIG. 4c illustrates another embodiment of the invention where the inner wall (22) is generally tapered upwards and is gradually reduced as it is comprised of horizontal sections of annular plates built together with vertical casings and with a casing-shaped centre section which extends up to the top inside the shell (10).
Figure 4D:
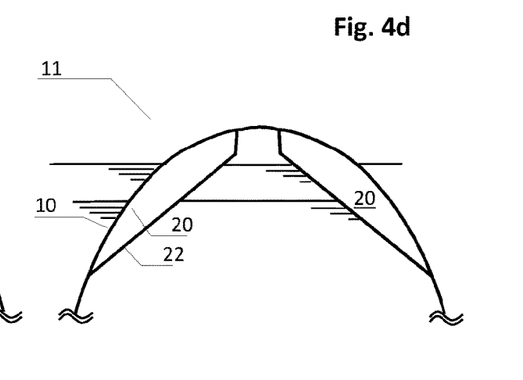
FIG. 4d illustrates an embodiment of the invention with a generally conical inner wall (22) of the ballast tank according to the invention, where the upper part of the inner wall (22) of the ballast tank runs above in a simple, relatively narrow casing at the top so that the free surface of the farming volume in, or closely below, the narrow casing becomes very small.

The ballast tank (20) can be one section or divided into several sections (23) by means of bulkheads (21). The ballast tank (20) is a buoyancy ballast tank, an upper ballast tank, i.e., it shall contribute to the farming tank's buoyancy to an adjustable degree by its air filling and can be ballasted down with water. We just call it "ballast tank (20)" below. An advantage of having such an internal and highly placed ballast tank (20) is that the shell (10) has a more and more reduced outer cross-sectional area (A10) (see FIG. 4a) the greater the draft of the shell (10); the shell then does not need an outer, annular buoyancy collar. This allows surface waves at sea to significantly reduce the slamming moment towards the upper section (11) of the tank and will reduce the hydrodynamic response of the preferably egg-shaped farming tank (1) comprising the movements which include heaving, rolling, stamping, gearing, jagging, swaying, but which, in this case in particular, should apply to rolling and stamping ("pitching"), as well as heaving. The upper section (11) of the farming tank (1) will act as a ripple shear for large enough waves, i.e., that the waves can strike over. Having the buoyancy ballast tank (20) inside the egg-shaped shell reduces the otherwise larger attack surface that the waves have on an outer floating collar, which would otherwise also form a wall that would give waves against the wall, and also greater accelerations from hydrodynamic responses.

Figure 1:
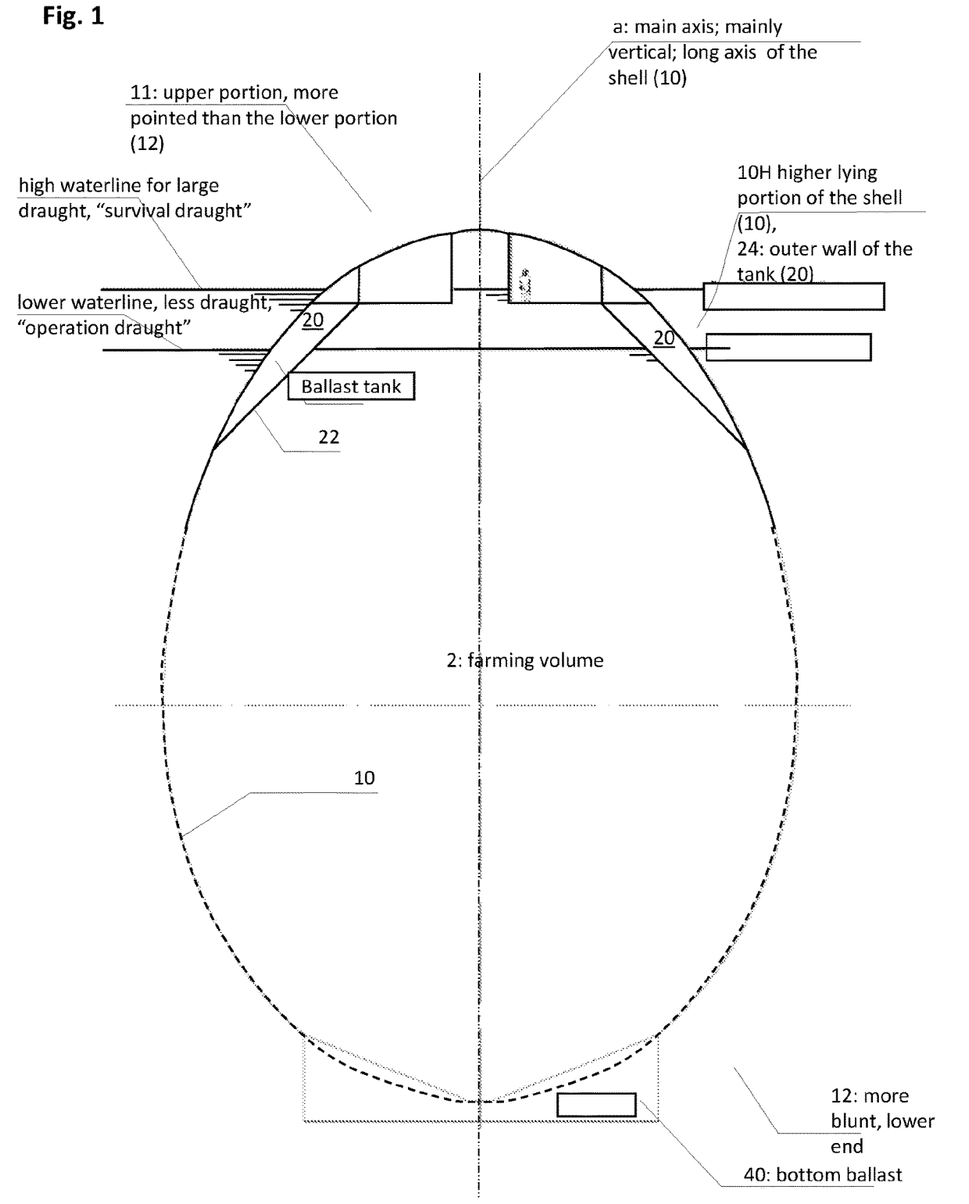
FIG. 1 is a vertical section through a generally egg-shaped farming tank (1) according to the invention and in which the ballast tank (20) in the embodiment shown has an inwardly directed conical wall (22) against the farming volume (2) and where the outer wall (24) of the ballast tank (20) is comprised of a higher-lying portion (10H) of the shell (10). The ballast tank can be annular and can be adjacent to a working deck which covers all or part of the central portion surrounded by the ballast tank and inside the upper part (11). The ballast level in the ballast tank (20) is adjustable and there are inlets and outlets for the farming volume (2) which means that the water level in the farming volume, to a certain extent, follows the degree of ballasting. An operation draft and a so-called survival draft are illustrated, which are covered by the extent of the degree of immersion adjusted by the ballast tank (20).

The draft of the farming tank (1) can be regulated essentially by water ballast in the ballast tank (20). The ballast system comprising the ballast tank (20) is adapted to be used to increase draft to e.g., so-called survival draft as shown in FIG. 1 in case of bad weather with demanding sea conditions or arranged to pump out water to reduce draft to other drafts, for example to an operating draft as shown in FIG. 1. so that one can have access to hatches to working decks and operate with a lowered water level in the farming volume to work with the fish.

An advantage of having the ballast tank (20) as an annular, inner structure is that the structure becomes easy to build, that it becomes strong due to its double curved surface, and that a continuous inner wall (22) can be obtained which gives lower weight than if the ballast tank should lie like a collar on the outside of the shell (10).

In one embodiment of the invention, the ballast tank (20) is generally axisymmetric annular with a continuous inner wall (22).

An advantage of having the ballast tank (20) located inside is mentioned above. A further advantage of having the ballast tank (20) annular and internal is that the construction becomes simple and has a continuous inner wall (22). The inner ballast tank (20) does not give much increased weight if the ballast tank (20) should be divided by bulkheads (21) into several separate tanks, and thus sloshing in the ballast tank (20) will also be prevented. The axis symmetry means that the farming tank (1), to a large extent, acquires sea properties that are independent of the weather direction, i.e., the wind and wave directions.

In one embodiment of the invention, the inner wall (22) of the ballast tanks (20) has a generally upwardly tapering shape. This can be step shaped, or funnel shaped as shown in section in FIGS. 1, 2, and 3.

An advantage of having an upwardly tapering inner wall (22), i.e., generally an inverted funnel shape, is that the inner cross-sectional area, i.e., of surface of the farming volume, decreases with increasing internal water level, that a reduced internal wave state is achieved, and that sloshing and thus the forces from rippling in the inner surface of the farming volume (2) decrease with increasing internal water level. This has two effects: The impact of the ripple on the hydrodynamic response is reduced. Thus, the hydrodynamic response of the tank becomes smaller at higher internal water levels than at lower internal water levels, and the accelerations become lower and the movements become calmer. This contributes to improved animal welfare for the salmon or any fish one could have in the tank.

In one embodiment of the invention, the upwardly tapering inner wall (22) is conical over a substantial part of its vertical extent.

Figure 2:
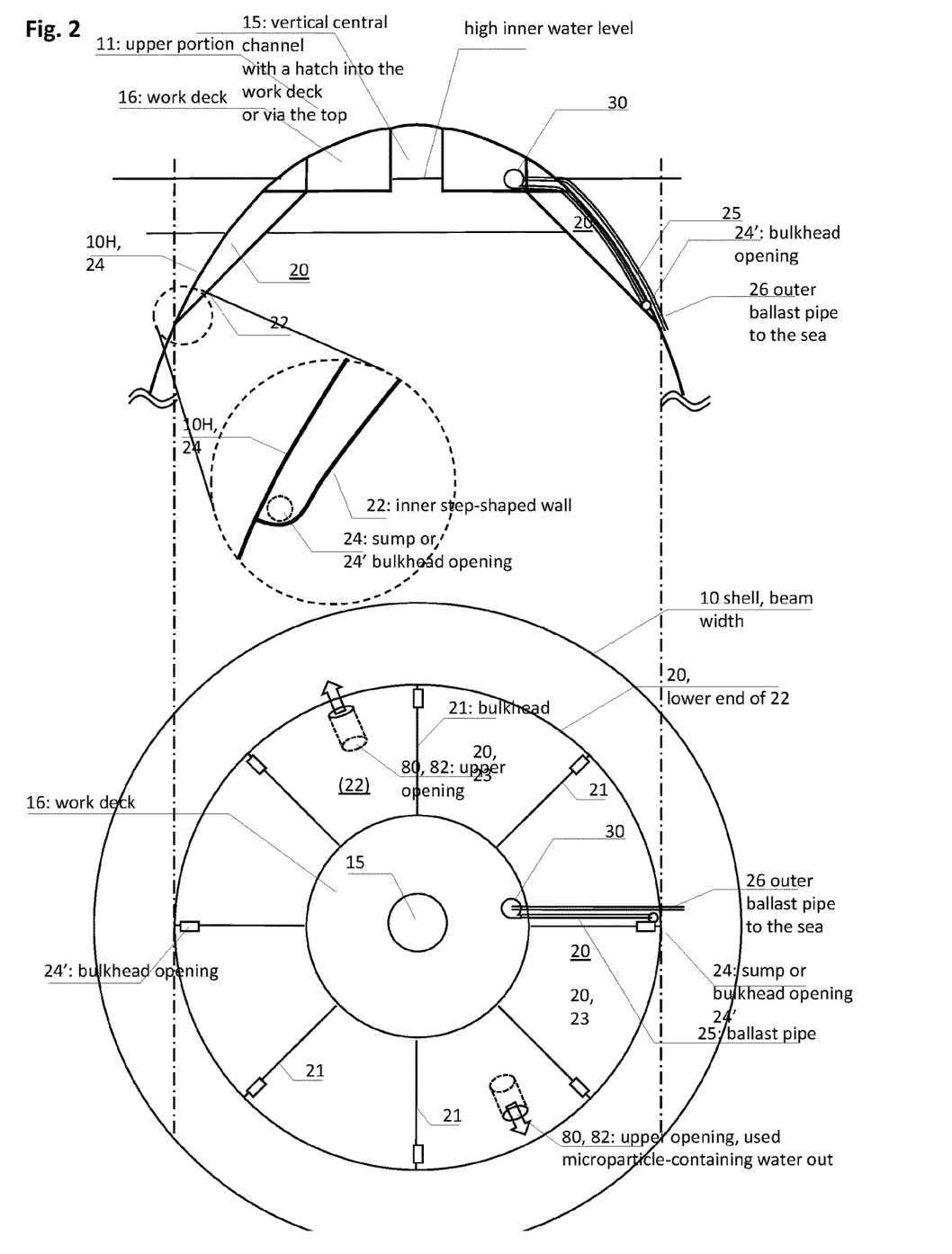
FIG. 2 illustrates possible details of the ballast tank in that on the right side of the upper part of the drawing, which is a vertical section of the tank (10), a pump (30) is arranged with an outer ballast supply pipe (26) and an inner ballast pipe (25) arranged to ballast up and down. The section on the left side of the upper part is enlarged and shows a rounding of the inner wall (24) at the lower end in the joint against the shell (10), and with a sump pipe (24) for draining the ballast tank (20). At the bottom of the page is an imaginary horizontal section or outline of an embodiment of the tank (10) (in outline) and a projected outline of the ballast tank (20) with pump and pipe and drainage.
Figure 3:
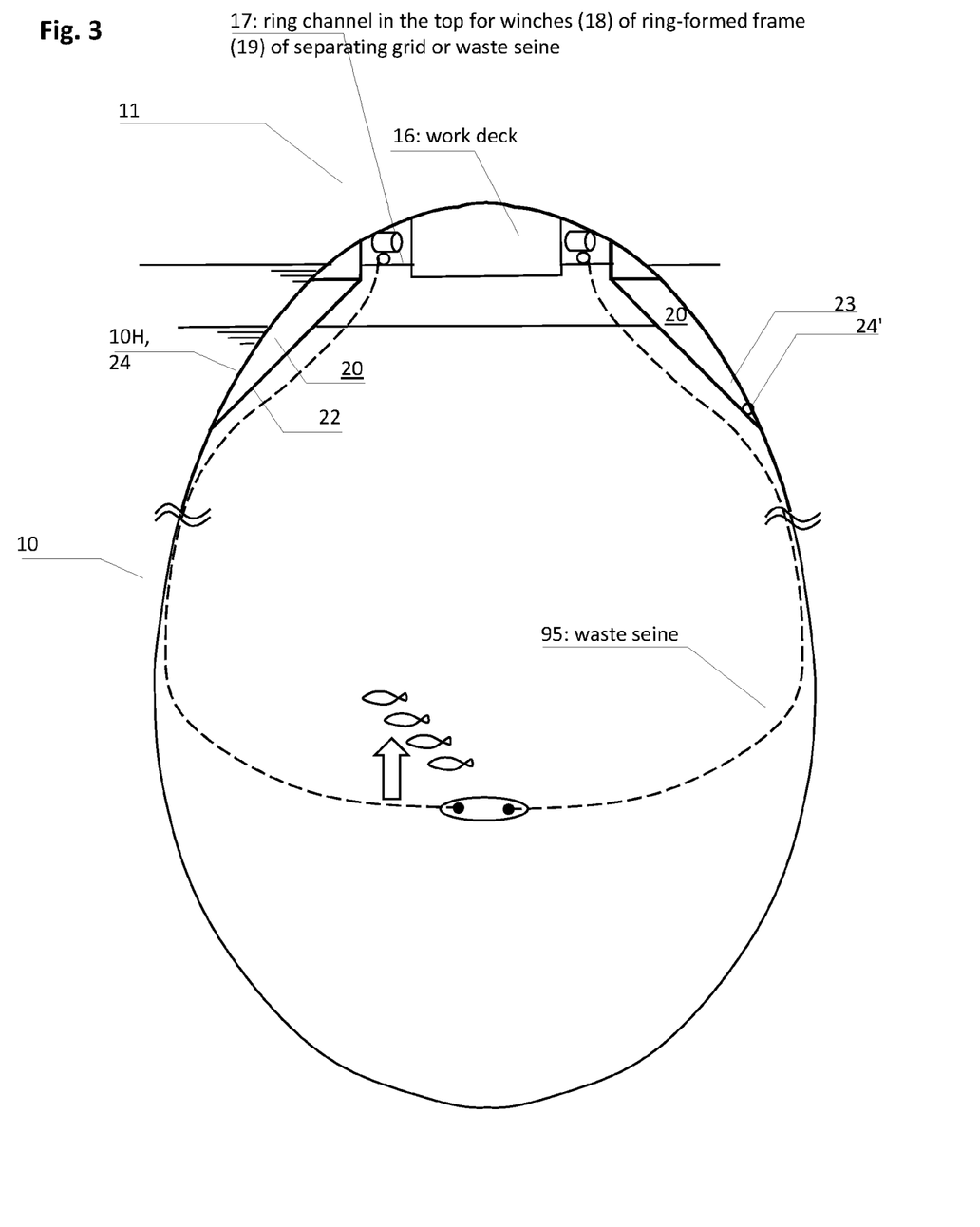
FIG. 3 illustrates an embodiment of the invention where an annular channel is arranged in the top section of an annular frame (19) with a possible waste seine or separating grid or the like, so that one can lower and raise equipment by winches (18).

In FIGS. 1, 2, and 3 it is shown that the inner wall (22), in its vertical section, forms approx. 45 degrees with the vertical line and forms a fairly acute angle with the shell (10). This transition can be rounded off towards the shell (10) in the construction, see the enlarged portion of the transition shown in FIG. 2, to simplify assembly/construction and to form a rounded lower part of the tank which provides space for drainage pipes (24), passages etc. low down in the ballast tank (20).

In one embodiment of the invention, the ballast tank (20) has a radial outer wall (24) which follows along a higher lying portion (10H) of the shell (10) or is formed by a high lying portion (10H) of the shell (10) itself.

In one embodiment of the invention, the tank (1) is equipped with a ballast pump (30) arranged to fill or empty the ballast tank (20) partially or completely with water via a ballast water channel (25).

In one embodiment of the invention mentioned above, i.e., the one with an egg shape and which is shown in the drawings, the shell (10) of the tank (1) is provided with a sharper end (11) upwardly directed and with a blunter portion (12) directed downwards, i.e., where the shell (10) has the shape of an egg with the pointed end (11) upwards.

We then refer to embodiments shown in FIG. 2. The ballast tank (20) can comprise radial, vertical bulkheads (21) in the ballast tank (20) which can thus comprise a number of ballast tank sectors (23). Bulkheads will counteract sloshing and unwanted instability and unwanted hydrodynamic responses by "ringing" in the ballast tank (20).

Regulation of the Upper Ballast Tank

In one embodiment of the invention, the high lying ballast tank (20) comprises at least one ballast pump (30) with a ballast pipe (25) down to near the bottom of the ballast tank (20), see FIG. 2. A bulkhead opening is shown (24') in the ballast tank (24). The ballast pump (30) and the ballast pipe are arranged to fill or to empty the ballast tank (20) to the desired degree. In one embodiment of the invention, the ballast pipe (25) runs down inside the ballast tank (20) itself. In one embodiment, an outer to sea supply pipe (26) runs between the pump and the sea outside the exterior of the shell (10), it must necessarily extend at least down to below the waterline when the ballast tank (20) is completely emptied and the shell (10) floats high, but the sea supply pipe (26) can also extend down via the ballast tank (20) and out through the shell (10) via a passage at the bottom of the ballast tank (20). A significant advantage of this is that we avoid disturbing pipes or having vulnerable pipes outside the tank or especially that we avoid ballast pipelines inside the actual farming volume (2) where the fish are and where cleaning and hygiene are important.

According to one embodiment of the invention, the ballast tank (20) is equipped with standing vertical bulkheads (21) and which thus divide the ballast tank (20) into a number of bulkhead spaces (23) or ballast tank sectors (23), see FIG. 2. To distribute ballast between the bulkheads (23) bulkhead openings (24') are provided.

In one embodiment of the invention, each ballast tank portion/bulkhead space (23) has a ballast pipe (25). The ballast pipe (25) can run down inside the bulkhead space (23)/ballast tank sector (22), in order to avoid "disturbing" pipes around, and in particular that we avoid having pipelines inside the farming volume (2).

Lower Ballast

In one embodiment of the invention, the tank (1) is provided with a ballast or ballast bottom tank (40) arranged inside or outside the shell (10) and near a lower end of the shell (10), for adjusting the mass centre downwards, and for this reason, increase the stability of the tank. If the tank itself has sufficient stability, one can do without solid ballast. However, in order to obtain a sufficient rectifying moment, it can be an advantage to have a ballast weight in the form of ballast or a ballast bottom tank (40). The ballast bottom tank (40) can be filled with seawater or a mass of higher density than seawater, e.g., sand slurry, and can be equipped with a ballast pump and ballast pipes from the deck or directly through a lower part of the shell (10).

Upper Channel

In one embodiment of the invention, the tank (1) is provided with a vertical channel (15) arranged axially in the upper portion (11), and where the vertical channel (15) is surrounded by a working deck (16) which extends below the upper desired water level, so that a small, free surface area is formed at such a highwater level. Advantages of such a vertical channel (15) are both that ripples are reduced to a minimum at high internal water levels, e.g., in "survival mode" or in the desired immersed mode, and that the fish after all has access to go up and snatch air, that gases can be vented via the space remaining in the vertical duct (15), and that one has access to a farming volume via a door or hatch (not shown).

Ring Channel at the Surface

According to one embodiment of the invention, the tank (1) comprises a ring channel (17) at the top of the ballast tank (20), see FIG. 2, where the ring channel (17) is open downwards towards the farming volume (2) and delimited upwards by the shell (10). In one embodiment of the invention, the annular channel comprises one or more winches (18) for raising and lowering an annular frame (19) for a separating grid or waste seine (95). The frame (19) can be raised above the water surface by the farming volume (2) so that it means (a) storing the frame (19) and equipment stored or connected to the frame above the inner water surface so as to avoid growth when the frame and/or the equipment is not in use in the farming volume (2), (i.e., in the water in the farming volume) and (b) it is avoided that the frame and the equipment stand in the way of fish going up to the surface to snatch air.

Inlet and Outlet for Replacement of Water in the Farming Volume

Figure 5:
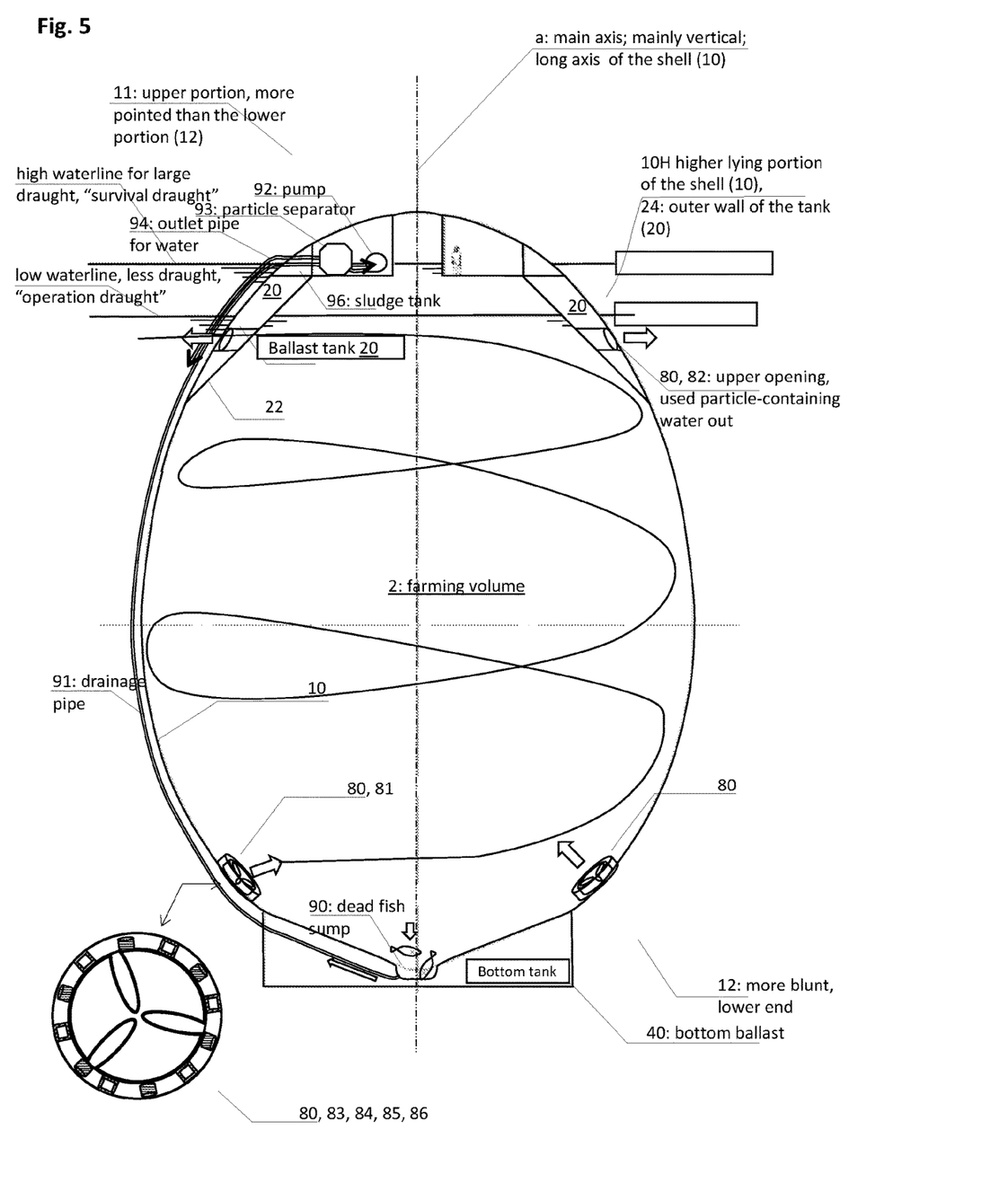
FIG. 5 illustrates a vertical section through embodiments of the invention and shows inlets (81) and outlets (82) for the main replacement of water to the farming volume, and pumps (80) in the inlet and/or the outlet. Furthermore.

In one embodiment of the invention, one or more pumps (80) are arranged through openings (81, 82) through the shell (10), see FIG. 2 and FIG. 5. In one embodiment, the openings (82) arranged through the wall (22) of the funnel-shaped portion which otherwise constitutes the wall of the tank (10) of the upper portion (10H) of the shell (10). Large replacement of water is required when the farming volume contains thousands upon thousands of kilos of farmed fish. The outlet through the openings (82) is arranged to take out used water with fine particles which do not settle, and which can appear as a thin cloud, and which can preferably drift away with the current, and which will not settle to the bottom.

In one embodiment of the invention, the pumps (80) are arranged so that the lower openings (81) are for water intake near the bottom portion (12) of the shell (1).

Filter devices are provided on the intakes to prevent the intake of small organisms such as *Gyrodactylus* and other unwanted organisms. There can be filters or grids on the outlets to prevent the ingress of unwanted organisms.

These designs allow one to take in cooler water near the bottom of the tank and send out used water near the surface. The inlets (81) can let the water in in a direction that has a certain tangential component to achieve circulation of the water masses. Likewise, the outlets (82) at the top can have a certain tangential component.

If the pumps (80) are arranged at the openings (82) through the upper portion (10H), a negative pressure will occur in the shell (10) so that the inner water level in the farming volume becomes somewhat lower than the outer waterline of the shell. If the pumps (80) are arranged in the inlet openings (81) in the lower part, an overpressure will occur in the shell (10) so that the inner water level becomes higher than the outer water line.

In one embodiment of the invention, the pump (80) is formed as an inverted propeller in the opening, with turbine blades (83) mounted in a shaft-free annular rotor (84) in a surrounding electrically annular stator (85), which are together comprised of a pump motor (86). A significant advantage of such an embodiment is that it builds very little in the axial direction; there is no gearbox or motor in the passage of the water stream, and it thus has a large cross-sectional area to pump significant amounts of water in or out of the farming volume (2).

Drainage of Settled Particles and Dead Fish.

Dead fish and particles will usually settle at the bottom. It is possible to regulate the feed so that precipitated particles from the fish sink. In one embodiment of the invention, a dead fish sump (90) is provided for such dead fish and precipitated bottom sludge at the bottom of the shell (10), see FIG. 5. The sump (90) has a drainage pipe (91) which runs upwards on or in the surface of the shell (10) to a space at the working deck (16) in the upper section (11), and the drainage water stream is driven by a pump (92). The drainage water stream is fed via a particle separator/treatment plant (93) which removes sludge to a sludge tank (96) and delivers purified water to the sea via an outlet pipe (94).

The invention claimed is:

1. A farming tank, comprising:
   a closed, rigid shell including a farming body for aquaculture animals, the shell being essentially ellipsoidal or egg-shaped and arranged to have a generally vertical main axis, the shell delimiting an inside from an outside; and
   at least one ballast tank arranged on the inside of the shell at an upper section of the shell, the at least one ballast tank having a radially outer wall which follows along a high-lying section of the inside of the shell or is formed by a high-lying section of the inside of the shell; and
   a ballast pump arranged to fill or empty the at least one ballast tank partially or completely with water via a ballast water pipe.

2. The farming tank according to claim 1,
   wherein the at least one ballast tank is generally axisymmetric and annular with a continuous inner wall.

3. The farming tank according to claim 2,
   wherein a radially inner wall of the at least one ballast tank has a generally upwardly tapering shape.

4. The farming tank according to claim 2,
   wherein the shell of the farming tank has a pointed end directed upwards and a flatter section pointed downwards.

5. The farming tank according to claim 2,
   wherein the at least one ballast tank further comprises a sump, and
   wherein the ballast water pipe extends down to the sump, and
   wherein the ballast pump, the ballast water pipe, and the sump are arranged to fill the at least one ballast tank to a desired degree, or to empty the at least one ballast tank to a desired degree.

6. The farming tank according to claim 2, wherein the at least one ballast tank includes upright vertical bulkheads dividing the ballast tank into two or more ballast tank sections.

7. The farming tank according to claim 1,
   wherein a radially inner wall of the at least one ballast tank has a generally upwardly tapering shape.

8. The farming tank according to claim 7,
   wherein the shell of the farming tank has a pointed end directed upwards and a flatter section pointed downwards.

9. The farming tank according to claim 7,
   wherein the at least one ballast tank further comprises a sump, and
   wherein the ballast water pipe extends down to the sump, and
   wherein the ballast pump, the ballast water pipe, and the sump are arranged to fill the at least one ballast tank to a desired degree, or to empty the at least one ballast tank to a desired degree.

10. The farming tank according to claim 7,
    wherein the upwardly tapering radially inner wall is conical over a substantial part of its vertical extent.

11. The farming tank according to claim 10,
    wherein the shell of the farming tank has a pointed end directed upwards and a flatter section pointed downwards.

12. The farming tank according to claim 10,
    wherein the at least one ballast tank further comprises a sump, and
    wherein the ballast water pipe extends down to the sump, and
    wherein the ballast pump, the ballast water pipe, and the sump are arranged to fill the at least one ballast tank to a desired degree, or to empty the at least one ballast tank to a desired degree.

13. The farming tank according to claim 1,
    wherein the shell of the farming tank has a pointed end directed upwards and a flatter section pointed downwards.

14. The farming tank according to claim 13,
    wherein the at least one ballast tank further comprises a sump, and
    wherein the ballast water pipe extends down to the sump, and
    wherein the ballast pump, the ballast water pipe, and the sump are arranged to fill the at least one ballast tank to a desired degree, or to empty the at least one ballast tank to a desired degree.

15. The farming tank according to claim 1,
    wherein the at least one ballast tank further comprises a sump, and
    wherein the ballast water pipe extends down to the sump, and
    wherein the ballast pump, the ballast water pipe, and the sump are arranged to fill the at least one ballast tank to a desired degree, or to empty the at least one ballast tank to a desired degree.

16. The farming tank according to claim 15, wherein the ballast water pipe runs down inside the at least one ballast tank itself.

17. The farming tank according to claim 1, wherein the at least one ballast tank includes upright vertical bulkheads dividing the at least one ballast tank into two or more ballast tank sections.

18. The farming tank according to claim 1, further comprising a ballast bottom tank arranged inside or outside on the shell and at a lower section of the shell.

19. The farming tank according to claim 1, further comprising a vertical channel arranged axially in the upper section,
    wherein the vertical channel is surrounded by a space with a working deck extending below a desired upper water level so that a small, free surface area is formed at the desired upper water level.

20. The farming tank according to claim 1, further comprising an annular channel at a top of the at least one ballast tank, the annular channel being open downwards towards the farming body and delimited upwards by the shell,
    wherein the annular channel houses one or more winches for raising and lowering an annular frame for a separating grid or a waste seine.

* * * * *